United States Patent [19]

Oshgan et al.

[11] 4,145,583
[45] Mar. 20, 1979

[54] REMOVABLE MICROPHONE HANGUP ADAPTER

[75] Inventors: Thomas J. Oshgan, Mt. Prospect; Ronald W. Polomsky, Schaumburg, both of Ill.

[73] Assignee: Motorola Inc., Schaumburg, Ill.

[21] Appl. No.: 822,976

[22] Filed: Aug. 8, 1977

[51] Int. Cl.² .............................................. H04M 1/06
[52] U.S. Cl. .................................... 179/146 R; 24/224
[58] Field of Search ............ 24/222, 223, 224, 129 R, 24/129 B, 252; 179/146 R

[56] References Cited

U.S. PATENT DOCUMENTS 520,723  5/1894  Bloomberg ........................ 24/222 X

*Primary Examiner*—William C. Cooper
*Attorney, Agent, or Firm*—Melvin A. Klein; James W. Gillman

[57] ABSTRACT

A removable hook for attachment to a microphone hangup button has a loop portion permitting a microphone to be conveniently hung from a suitable projection. Two parallel, spaced apart rails extending from the loop have inwardly extending portions for slideably engaging the grooves in the undercut portion of the hangup button. A resilient arm member extends over and holds the microphone hangup button in place.

5 Claims, 3 Drawing Figures

U.S. Patent  Mar. 20, 1979  4,145,583
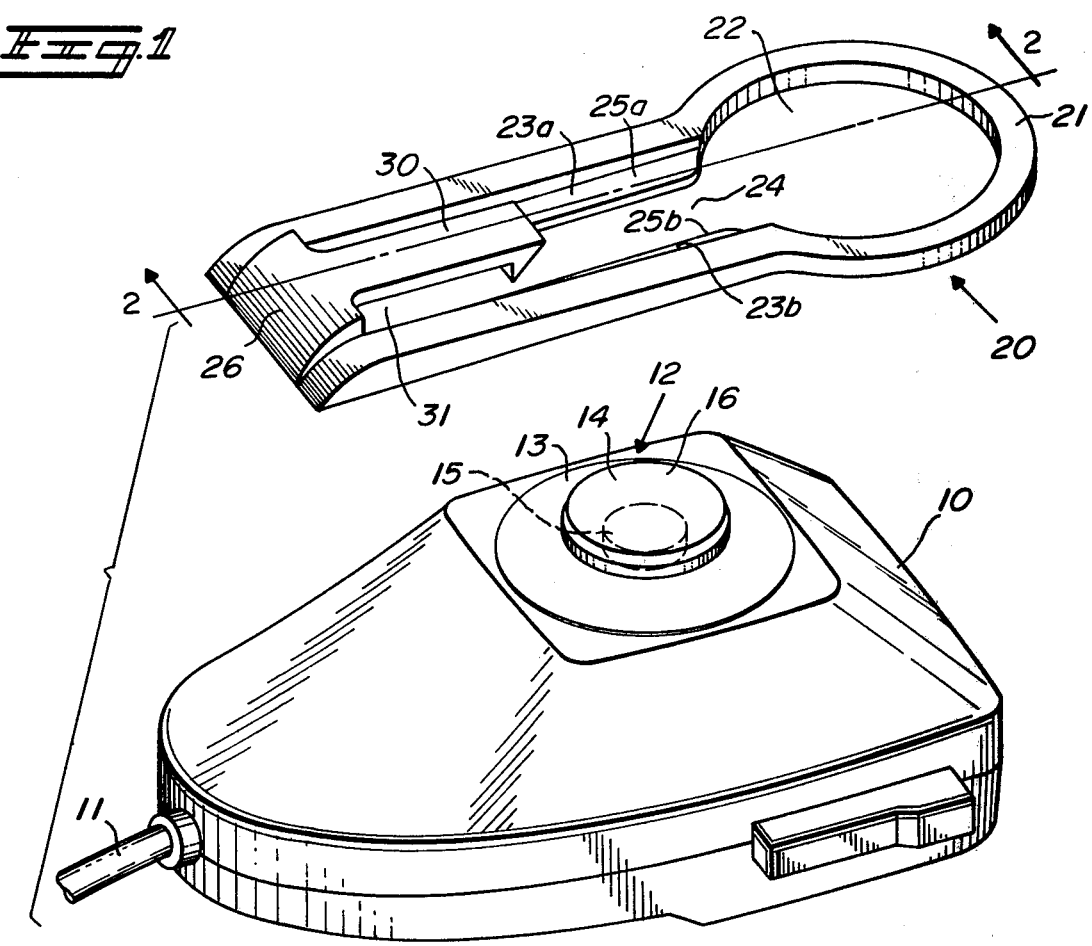
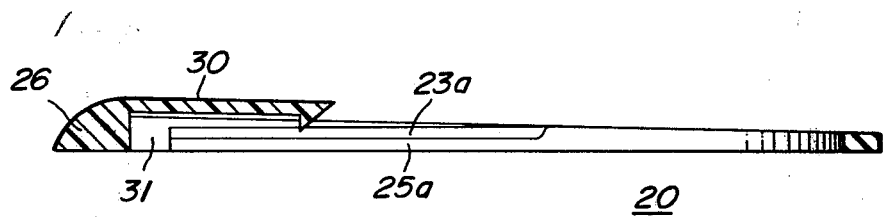
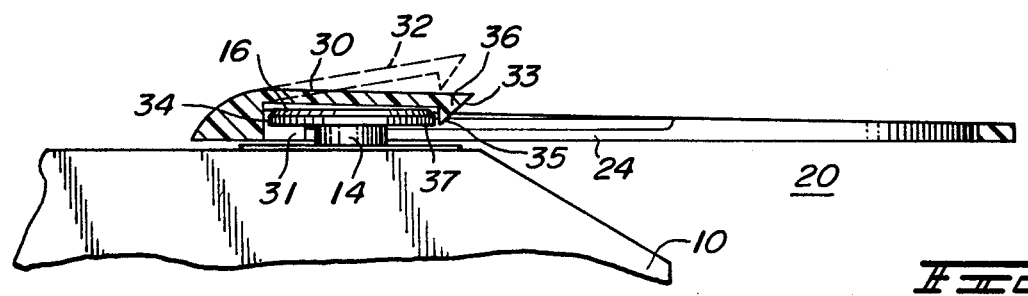

REMOVABLE MICROPHONE HANGUP ADAPTER

BACKGROUND OF THE INVENTION

1. Field of the Invention

This invention generally relates to apparatus for supporting microphones; and, more particularly, to a removable adapter for hanging a microphone, said microphone having a hangup button thereupon.

2. Description of the Prior Art

In the prior art, microphones for use, for example, with radio communication equipment have had a microphone hangup button attached thereto. The type of microphone generally being referred to in this patent application is one which fits within the palm of the users hand, has a flexible connection cable attached thereto and is intended to be held in the users hand. A microphone hangup button is usually provided with this type of microphone. The hangup button generally is a low cylindrically shaped piece projecting from the rear surface of the hand-held microphone. An undercut groove is formed near the base of the cylinder, leaving a top cap portion, said cap portion having a disc configuration and attached at its center to the undercut portion of the cylinder. The grooved formed by the under cutting of the cylinder is designed to mate with a conventionally microphone hangup clip. Conventional microphone hangup clips are permanently affixed to something located near the radio operator's working location. A conventional microphone hangup clip generally is a metal piece having two finger portions for engaging the microphone button groove. A third resilient finger overlays the space between the first two fingers and provides a light pressure against the top of the microphone button. The fingers as mentioned generally extend from a base portion which has apertures contained therein for accepting mounting screws. Generally, conventional microphone hangup clips of the type described are permanently affixed to one location by means of sheet-metal screws or other conventional fastening hardware, requiring drilling and various attachment operations to fasten said hangup clip to the desired location. In a mobile radio environment, such as in an automobile, the locations for attaching a conventional microphone hangup clip are often not convenient and some radio operators merely place the microphone on the seat beside them or in some other convention location. Obviously, this practice has some hazards associated therewith. For example, the loosely lying microphone during a sudden stop or other driving maneuver may fly around becoming a danger to both personnel and other equipment as well as possibly damaging the microphone itself.

SUMMARY OF THE INVENTION

Accordingly, an object of this invention is to provide a hand-held microphone hangup which allows a microphone to be safely hung from a conveniently located projection.

Another object of the invention is to provide an easily removed adapter member for hanging a microphone from a variety of locations without requiring any drilling or assembly operations.

Another object of the invention is to provide a microphone hangup adapter which is snap-fit secured to a conventional microphone hangup button.

Another object of the invention is to provide a microphone hangup which is economically produced.

Briefly, in practicing this invention, a removable hook member is provided for hanging a microphone from a suitable projection. The microphone has a microphone hangup button extending therefrom, which button has undercut sides with grooves contained therein forming an overhanging end. The adapter member has a loop portion with a central aperture therein for hanging the microphone. Two parallelly located rail members extend from the loop member, forming a channel therebetween with each rail having inwardly extending portions for engaging the grooves in the undercut sides of the microphone hangup button. An end portion of the adapter member is attached to the ends of the rail members and provides a stop for the microphone hangup button said button being slideably engaged with the inwardly projecting rail portions. The end of the microphone hangup button is snap-fit engaged by a resilient member. According to one aspect of the invention, the resilient member is an arm having an end portion which projects towards the channel formed between the rails and snaps into position to retain the microphone hangup button in a predetermined location. According to another aspect of the invention, the resilient arm member has an angled surface position at the free end thereof for allowing the end of the microphone hangup button to force the free end of the resilient arm aside to permit passage of a microphone button. Another surface located near the end of the resilient arm retains the microphone hangup button in position.

BRIEF DESCRIPTION OF THE DRAWINGS

For a more complete understanding of the invention, reference is made to the drawing in which:

FIG. 1 is an exploded perspective view of a hand-held microphone and a removable adapter member according to the invention;

FIG. 2 is a sectional view of the hook member according to the invention taken along section line 2 of FIG. 1; and FIG. 3 is the sectional view of the adapter member with a microphone positioned therein.

DESCRIPTION OF THE PREFERRED EMBODIMENT

Referring to FIG. 1 of the drawings, a hand-held microphone 10 of the type generally used with mobile and fixed-station radio communication equipment is shown. A multiple line cable 11 extends out of the microphone 10 and provides the various electrical connections required. Affixed to a surface of the microphone 10 is a microphone hangup button assembly 12 which includes a large metallic disc 13 imbedded in the surface of the microphone 10. Perpendicularly affixed to the surface of the microphone 10 is a hangup button 14 which is in the form of a low cylinder. A portion of the side wall of the cylinder is undercut and has a groove 15 therein. The top portion of the hangup button assembly 14 overlays the groove 15.

FIG. 1 also shows a hook member 20 which is designed to be removablely affixed to the hand-held microphone 10 and to provide a structure for hanging said microphone from any suitable projection. A preferred embodiment of the adapter member 20 is an injection molded polycarbonate plastic piece. A loop 21 in the shape of a thin ring having a central aperture 22 is provided for hanging the microphone from a suitable projection which includes the knobs of the radio equipment, various knobs and projections in an automobile, such as, the window crank arms and the cigarette lighter, as well as any other suitable projection. In operation, the loop extends around the projecting portion and the projecting portion passes through the aperture 22. It is noted that the particular configuration of the loop member is not limited to a thin circular ring as shown. Extending from the loop member 21 are two generally parallel, spaced-apart rail members 23a, 23b. The rail members form a channel 24 therebetween. The channel 24 is bordered by two inwardly extending portions 25a, 25b of the rail members 23a, 23b which are somewhat thinner in thickness than the main body of the rail members. The inwardly extending portions are spaced-apart approximately the thickness of the hangup button 14 in the groove 15 area so that the hangup button 14 may slideably pass through the channel 24 with the hangup button 14 being held by the inwardly extending portions 25a, 25b. An end portion 26 is provided on the adapter member, said end portion being generally perpendicular to and extending from the ends of the rail members 23a, 23b opposite the loop 21. The top 16 of the hangup button 14 is stopped by the end portion 26 as the hangup button 14 with the microphone 10 attached thereto slides through the channel 24.

A resilient arm portion 30 extends from the end portion 26 over the channel 24. A space 31 is provided beneath the resilient arm portion 30 for containing the top 16 of the hangup button 14 in position near the end portion 26.

Referring to FIG. 2 of the drawing, a sectional view of the adapter member 20 is shown with the inwardly extending portion 25a shown projecting from the rail member 23a. The end portion 26 has a resilient arm portion 30 extending therefrom over the space 31 provided for the bulbous end of the microphone hangup button 14.

FIG. 3 shows the microphone 10 in the locked position with respect to the adapter member 20. The top 16 of the hangup button 14 is contained within the space 31 beneath the resilient arm portion 30 with the groove portion 15 being contained within the channel 24 formed between the inwardly extending portions 25a and 25b of the rail members 23a, 23b. The resilient arm portion 30 is also shown in a dotted configuration 32 indicating the flexible character of the resilient arm portion 30.

At the free end of the resilient arm member 30 is an angled surface 33. The surface is at an oblique angle with respect to the direction of motion of the microphone hangup button 14 into the channel 24. The peripheral edge portion 34 of the bulbous portion of the hangup button 14 is contacted by the point 35 of the downwardly projecting portion 36 of the resilient arm member 30 defined by the angled surface 33 and the perpendicularly extending surface 37 at the end of the resilient arm member 30. As the microphone hangup button is further pushed along the channel 25, the free end of the resilient arm member 30 moves away from the main body of the adapter member 20 as shown by the dotted resilient arm 32. The point 35 of the resilient arm member 30 slides along the top surface of the microphone hangup button 14 until the button clears the point 35. The resilient arm member 30 then snaps down and assumes its normal position. The perpendicularly extending surface 37 at the end of the resilient arm member 30 prevents the top portion 16 of the hangup button 14 from being allowed to move. Since the perpendicularly extending surface 37 will not allow any force to be exerted in an upward direction against the free end of the resilient arm member 30, the hangup button 14 is captured within the space 31 beneath the resilient arm member 30 by the snap-fit action provided by the free end of the resilient arm member 30.

While a particular embodiment of the present invention has been shown and described, it should be understood that the invention is not limited thereto since many modifications may be made. It is therefore contemplated to cover by the present application any and all such modifications that fall within the true spirit and scope of the basic underlying principles disclosed and claimed herein.

We claim:

1. A removable adapter member for hanging a microphone, from any suitable projection, the microphone having a microphone hangup button extending outwardly therefrom, said hangup button having undercut sides with grooves therein forming a top portion, the adapter member comprising:

a loop member having a central aperture therein permitting the hook member to be hung from any suitable projection;

two parallel spaced-apart rail members extending from the loop member, said rails forming a channel therebetween and each rail having an inwardly extending portion for engaging the grooves in the undercut sides of the microphone hangup button with the microphone hangup button grooves slideably engaging the inwardly extending rail portions;

an end member perpendicular to and extending from the ends of the rail members opposite the loop member, said end member providing a stop for the top end of the microphone hangup button;

a resilient member extending from the end portion over the channel for snap-fit engaging the top end of the microphone hangup button.

2. The hook member of claim 1 wherein the loop member is a thin ring having the central aperture therein connected to the channel between the rails.

3. The adapter member of claim 1 wherein the member is formed from a polycarbonate material.

4. The adapter member of claim 1 wherein the resilient member is an arm having a projecting end portion projecting toward the channel and snapping into a position opposite the end member and adjacent to the top portion of the microphone hangup button to locate the microphone hangup button between the rail members in a position adjacent to the end member.

5. The adapter member of claim 4 wherein the resilient arm member has a first angled surface positioned at the free end thereof located away from the end member, said surface being at an oblique angle to the direction of motion of the microphone hangup button into the channel so that the peripheral edge of the bulbous end of the microphone hangup button forces the free end of the arm away from the channel and permits the microphone button to pass by the free end of the resilient arm, the arm member having a second surface extending perpendicularly toward the channel and located adjacent to the angled surface so that the top portion of the microphone hangup button is snap-fit retained.

* * * * *